US009413727B2

(12) United States Patent
Ardeli et al.

(10) Patent No.: US 9,413,727 B2
(45) Date of Patent: Aug. 9, 2016

(54) METHOD AND APPARATUS FOR CONTENT FILTERING ON SPDY CONNECTIONS

(71) Applicant: Aruba Networks, Inc., Sunnyvale, CA (US)

(72) Inventors: Ramesh Ardeli, Sunnyvale, CA (US); Hari Krishna Kurmala, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 139 days.

(21) Appl. No.: 14/522,251

(22) Filed: Oct. 23, 2014

(65) Prior Publication Data

US 2016/0119288 A1    Apr. 28, 2016

(51) Int. Cl.
*G06F 9/00* (2006.01)
*H04L 29/06* (2006.01)
*H04L 29/08* (2006.01)

(52) U.S. Cl.
CPC ........ *H04L 63/0281* (2013.01); *H04L 63/0227* (2013.01); *H04L 67/02* (2013.01)

(58) Field of Classification Search
CPC .. H04L 63/0281; H04L 63/0227; H04L 67/02
See application file for complete search history.

(56) References Cited

U.S. PATENT DOCUMENTS

| 2004/0001433 | A1* | 1/2004 | Gram ................. H04L 12/24 370/229 |
| 2005/0076113 | A1* | 4/2005 | Klotz ............. H04L 12/2602 709/224 |
| 2007/0121529 | A1* | 5/2007 | Meier ............. G06F 15/0225 370/256 |
| 2009/0154702 | A1* | 6/2009 | Tamura ............. H04B 7/022 380/270 |
| 2012/0089694 | A1* | 4/2012 | Pandya ............. H04L 29/06 709/212 |
| 2014/0207850 | A1* | 7/2014 | Bestler .............. G06F 17/30 709/203 |

* cited by examiner

*Primary Examiner* — Techane Gergiso
(74) *Attorney, Agent, or Firm* — Hewlett Packard Enterprise Patent Department

(57) ABSTRACT

The present disclosure discloses a method and a network device for performing content filtering on SPDY connections. Specifically, a network device receives, from a client device, a first control frame identifying a first maximum number of unsolicited unacknowledged messages related to a web resource that can be transmitted by a web server. The network device transmits to the web server a second control frame identifying a second and different maximum number of unsolicited unacknowledged messages related to the web resource that can be transmitted by the web server. In some embodiments, the network device establishes a first connection with the client device without forwarding the request to the web server, and a second connection with the web server. Further, the network device inspects data in the unsolicited unacknowledged messages and forwards at least portion of the data to the client device using the first connection.

20 Claims, 10 Drawing Sheets

METHOD AND APPARATUS FOR CONTENT FILTERING ON SPDY CONNECTIONS

FIELD

Embodiments of the present disclosure relate to content management by network devices. In particular, embodiments of the present disclosure describe a method and network device for performing content filtering on SPDY connections in a network.

BACKGROUND

SPDY protocol addresses the bottlenecks of HTTP protocols by one or more of the followings: (1) SPDY protocol minimizes the number of TCP connections through multiplexing requests; (2) SPDY protocol prioritizes requests where client devices could request some web resources to be delivered before others; (3) SPDY protocol compresses HTTP headers, and thereby improving the bandwidth utilization; and (4) SPDY protocol enables web servers to push web contents without a request from client device.

Note that, SPDY protocol requires that the web content be sent over a SSL/TLS connection with the TLS Next Protocol Negotiation (NPN) extension. Because SPDY requires the data transmitted to be encrypted, web content filtering cannot be performed without SPDY proxy support. As a result, malware, spyware, and/or virus subsequently can enter the network. Also, because web server can push contents without a request from the client device, the probability of a malware or spyware infecting the web content that enters the network is quite high.

DETAILED DESCRIPTION

In the following description, several specific details are presented to provide a thorough understanding. While the context of the disclosure is directed to content management by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to content management by network devices. In particular, embodiments of the present disclosure describe a method and network device for performing content filtering on SPDY connection in a network.

In generally, embodiments of present disclosure solve the challenges introduced by SPDY protocol in enforcing web content filtering by one or more of the followings: (1) adding support for SPDY proxy at a network controlling device; (2) inspecting SYN_STREAM control frames received from client devices; (3) dynamically injecting SPDY SETTINGS control frame to prevent or limit the content pushed by servers without a request; (4) modifying SPDY SETTINGS control frame from client devices; (5) inspecting server-pushed unidirectional SYN_STREAM control frames; and (6) inspecting server-pushed data frames.

With the solution provided herein, a network device receives, from a client device, a first control frame identifying a first maximum number of unsolicited unacknowledged messages related to a web resource that can be transmitted by a web server. The network device then transmits to the web server a second control frame identifying a second maximum number of unsolicited unacknowledged messages related to the web resource that can be transmitted by the web server. Note that, the second maximum number of unsolicited unacknowledged messages related to the web resource that the network device allow the web server to transmit to the client device is different from the first maximum number of unsolicited unacknowledged messages related to the web resource that can be transmitted by the web server.

Figure 1:
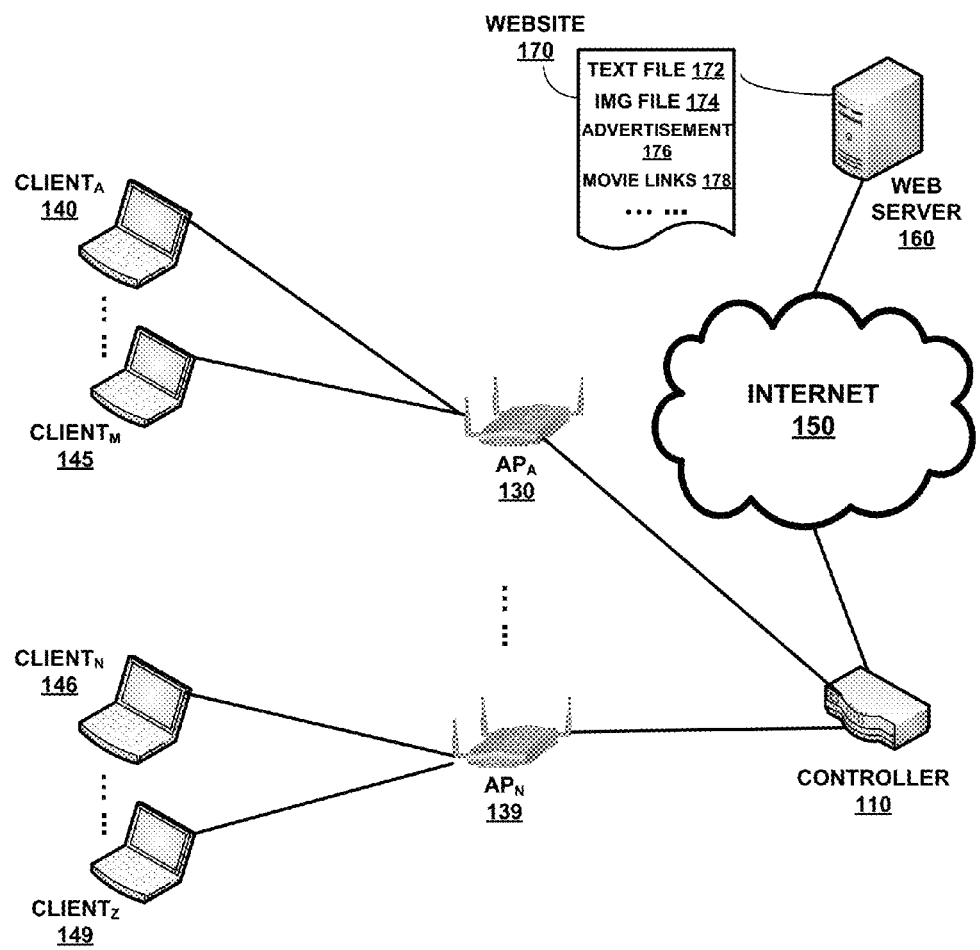
FIG. 1 shows an exemplary network environment according to embodiments of the present disclosure.

Moreover, according to some embodiments, the network device receives, from a client device, a request for a first connection with a web server to obtain a web resource. Then, the network device establishes a first connection between the network device and the client device without forwarding the request to the web server, whereas the network device functions as a proxy for the web server. Also, the network device establishes a second connection between the network device and the web server. Furthermore, the network device receives one or more unsolicited unacknowledged messages corresponding to the web resource from the web server via the second connection. Next, the network device inspects data in the one or more unsolicited unacknowledged messages and forwards at least portion of the data to the client device using the first connection Network Computing Environment FIG. 1 shows an exemplary network environment according to embodiments of the present disclosure. Specifically, FIG. 1 illustrates a network that includes at least a web server 160 that hosts a website 170, Internet 150, a network controller 110, a number of access points (APs) (such as, $AP_A$ 130 to $AP_N$ 139), and a plurality of client devices, such as $Client_A$ 140, ..., $Client_M$ 145, $Client_N$ 146, ..., $Client_Z$ 149, etc.

Web server 160 generally refers to a network computer system that processes requests via Hypertext Transfer Protocol (HTTP). HTTP generally refers to a network protocol that is used to distribute information by exchanging or transferring hypertext on the World Wide Web (WWW). Hypertext generally refers to structured text that uses logical links (hyperlinks) between nodes containing text. In the example illustrated in FIG. 1, web server 160 hosts website 170, which includes at least one or more text files 172, image files 174, advertisements 176, movie links 178, etc.

Note that, web server 160 can also provide other services. In general, a service is an abstraction of web resources. A client device can be agnostic of how the server performs while fulfilling the request and delivering the response. The client device only needs to understand the response based on a mutually agreed application protocol, e.g., HTTP, FTP, etc.

Web server 160 may be connected to network controller 110 via an Internet 150. Alternatively, web server 160 may be a part of the same wired and/or wireless local area network that network controller 110 belongs to.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. For illustration purposes only, assuming that, in FIG. 1, a first set of client devices, such as $Client_A$ 140, ..., $Client_M$ 145, associate with $AP_A$ 130. Moreover, assuming that a second set of client devices, such as $Client_N$ 146, ..., $Client_Z$ 149, associate with $AP_N$ 139.

During operations, client devices (e.g., $Client_A$ 140 to $Client_Z$ 149) and servers (e.g., web server 160) exchange messages following a request-response pattern. Specifically, a client device (e.g., $Client_A$ 140) initially sends a request message. The request message will be received by APA 130 that ClientA 140 is associated with. APA 130 then forwards the request to the network infrastructure. In the example illustrated in FIG. 1, network controller 110 will receive the request message, inspect the network packet, apply network policies, and forward the request message to its destination (e.g., web server 160). Then, web server 160 returns a response message. A server (e.g., web server 160) may receive and process a large number of requests from many different client devices. Moreover, when a client device (e.g., $Client_A$ 140) retrieves contents of a website (e.g., website 170), the client device may need to send multiple request messages in order to retrieve the content of a single web page.

Web Content Retrieval with TCP Protocol

Figure 2:
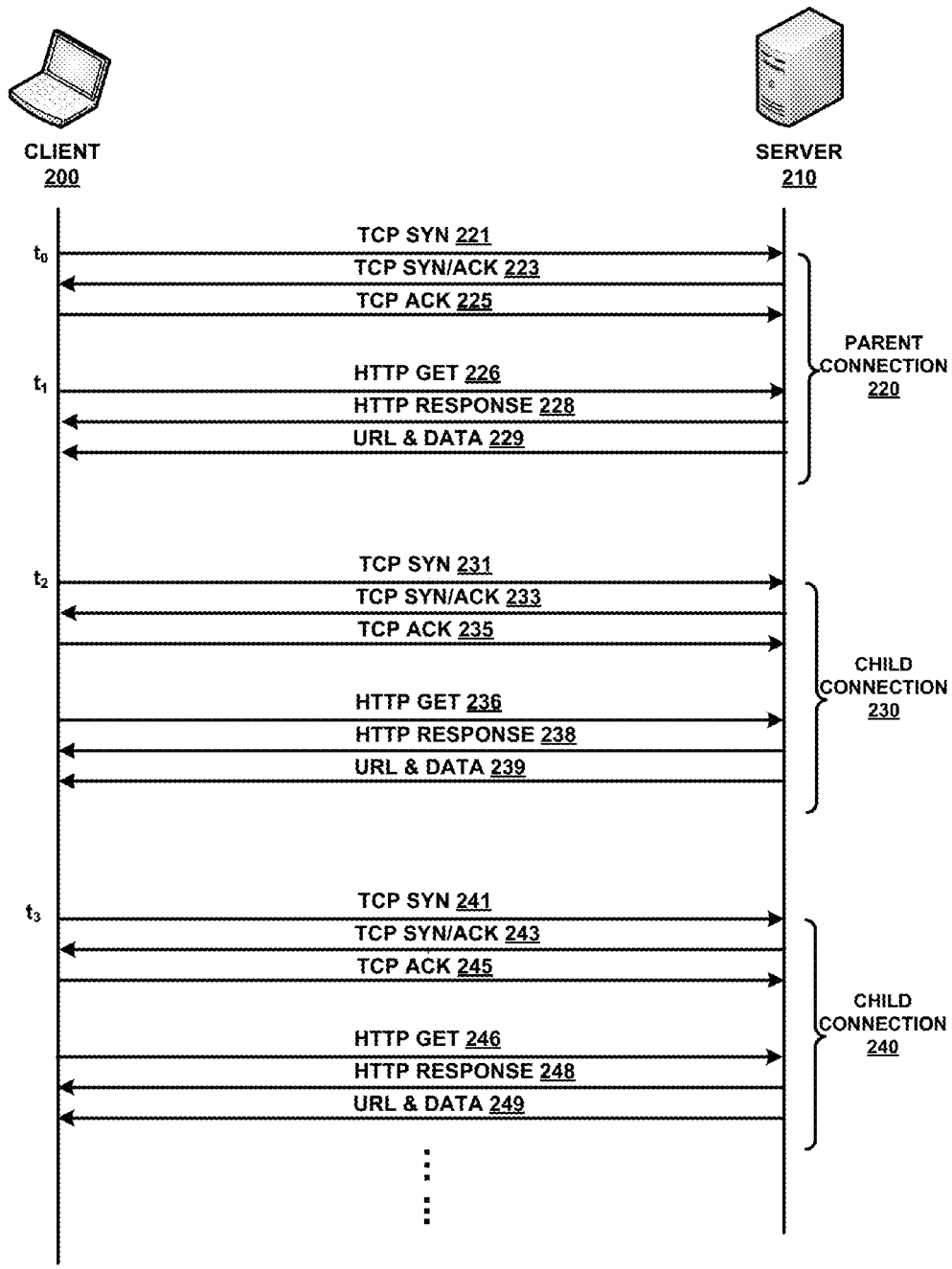
FIG. 2 shows a sequence diagram illustrating exemplary network communication exchanges involved during retrieval of a website according to embodiments of the present disclosure.

FIG. 2 shows a sequence diagram illustrating exemplary network communication exchanges involved during retrieval of a website according to embodiments of the present disclosure. FIG. 2 includes at least a client device 200 and a server 210. In order to retrieve a website hosted by server 210 (e.g., cnn.com), client device 200 initiates a three-way handshake to establish a Transmission Control Protocol (TCP) connection at time point $t_0$. The three-way handshake includes at least a TCP SYN message 221 that client device 200 sends to server 210. Client device 200 will set the segment's sequence number to a random value A. In response, server 210 replies with a TCP SYN/ACK message 223. The acknowledgment number is set to be one more than the received sequence number i.e. A+1, and the sequence number that the server chooses for the packet is another random number, B. Finally, client device 200 sends a TCP ACK 225 back to server 210. The sequence number is set to the received acknowledgement value i.e. A+1, and the acknowledgement number is set to one more than the received sequence number i.e. B+1. Thereafter, a full-duplex TCP connection is established.

At time point $t_1$, after establishment of TCP connection, client device 200 will send an HTTP GET message 226 to request a website hosted by server 210 (e.g., cnn.com). Once server 210 receives HTTP GET message 226, server 210 will replies with an HTTP RESPONSE 228, along with a set of uniform resource locators (URLs) and data 229.

The TCP three-way handshake and the HTTP exchanges, e.g., messages 221-229, collectively are completed with a parent connection 220. Subsequently, every time when URLs are received, a number of child connections, such as child connection 230 and child connection 240 are established in order to retrieve sub-content of the website as identified by the URLs returned from server 210 in parent connection 220.

For example, at time point $t_2$, client device 200 initiates a child connection 230 to retrieve a movie video stream by a three-way TCP handshake that includes a TCP SYN message 231 sent from client device 200 to server 210, a TCP SYN/ACK message 233 returned from server 210 to client device 200, and a TCP ACK message 235 sent from client device 200 to server 210. Thereafter, the TCP three-way handshake is followed by a set of HTTP communication exchanges that include an HTTP GET message 236 transmitted from client device 200 to server 210, an HTTP RESPONSE message 238 transmitted from server 210 back to client device 200, and optionally URLs and data 239.

Similarly, at time point $t_3$, client device 200 may initiate another child connection 240 to retrieve an image in the website (e.g., cnn.com) by a three-way TCP handshake that includes a TCP SYN message 241 sent from client device 200 to server 210, a TCP SYN/ACK message 243 returned from server 210 to client device 200, and a TCP ACK message 245 transmitted from client device 200 to server 210. Thereafter, the TCP three-way handshake is followed by a set of HTTP communication exchanges that include an HTTP GET message 246 transmitted from client device 200 to server 210, an HTTP RESPONSE message 248 transmitted from server 210 back to client device 200, and possibly URLs and data 249.

Therefore, there are a few issues with the website retrieval using TCP protocol alone. First, there might be too many TCP connections established. It is not uncommon for a client device (e.g., client device 200) to establish a large number of TCP connections (e.g., 40 to 80 connections for a website like cnn.com) with a server (e.g., server 210) in order to retrieve the entire web content of the website. Second, the TCP connections may be slow, because the client device may need to sequentially retrieve a set of objects in a website. Moreover, using TCP protocol to retrieve a complex website, such as cnn.com, may trigger TCP slow start problem.

Figure 3:
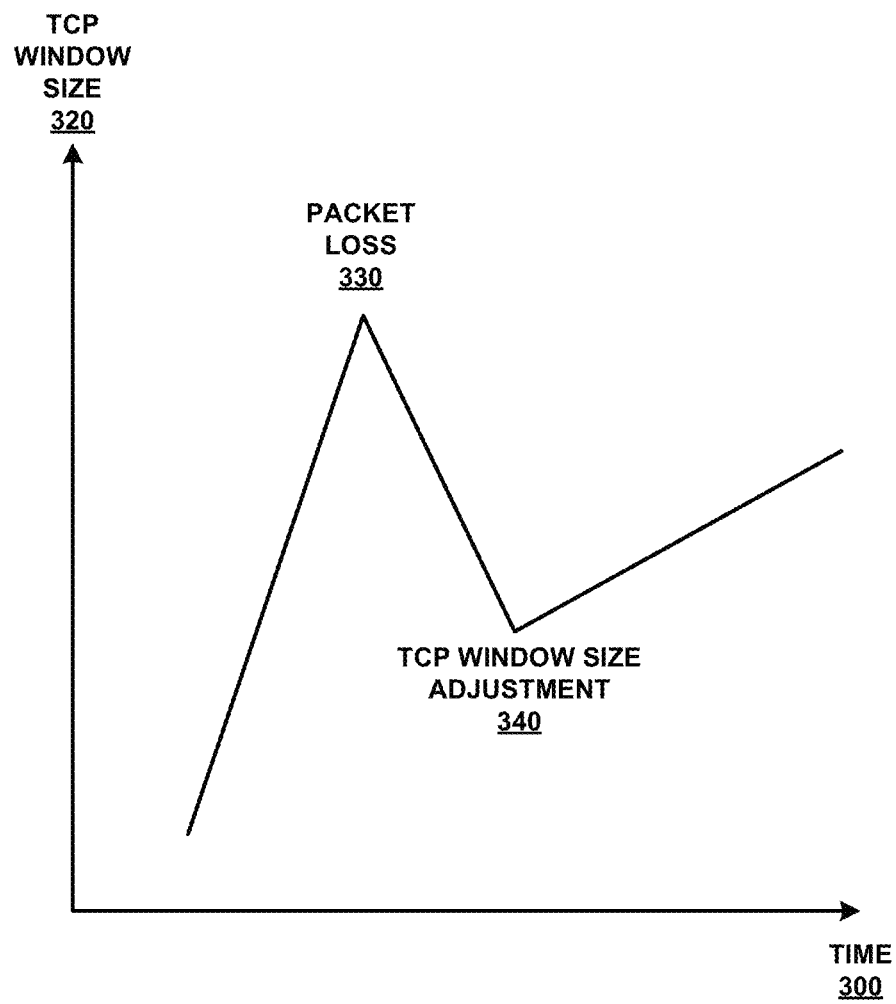
FIG. 3 shows a diagram illustrating impact of a network packet loss on a TCP connection according to embodiments of the present disclosure.

Specifically, FIG. 3 shows a diagram illustrating impact of a network packet loss on a TCP connection according to embodiments of the present disclosure. The throughput of a TCP communication is limited by two windows: the congestion window and the receive window. The former tries not to exceed the capacity of the network (congestion control) and the latter tries not to exceed the capacity of the receiver to process data (flow control). Slow-start is part of the congestion control strategy used by the TCP. The TCP window size controls the amount of unacknowledged data that a client device is allowed to send. As shown in FIG. 3, after a TCP connection is established, the TCP window size will keep increasing. Initially, the TCP window size may increase fairly rapidly, e.g., following an exponential increase pattern. However, once the window hits a limit, packet loss 330 will occur. Then, TCP window size adjustment 340 will follow. For example, the TCP window size may be adjusted to half of the size prior to the detection of TCP packet loss 330. Moreover, after TCP window size adjustment 340, the rate of increase for the TCP window size will slow down to test the TCP connection, and thereby no longer following an exponential curve.

Moreover, a typical HTTP GET message includes at least the following fields: method (e.g., "GET"), URL, host (e.g., "cnn.com"), and user agent. The user agent field can be quite large, and is send with every HTTP GET request message. Therefore, when a client device opens a large number of TCP connections to retrieve the content of a website, the large block of user agent in the HTTP message headers are repeated.

In addition, TCP-based web content retrieval faces security issues. For example, a man in the middle can intercept the web content that is non-encrypted. Furthermore, compression algorithm can reduce the size of a user agent from 200 bytes to 15 bytes. However, the TCP packets are uncompressed.

Web Content Retrieval with SPDY Protocol

Figure 4:
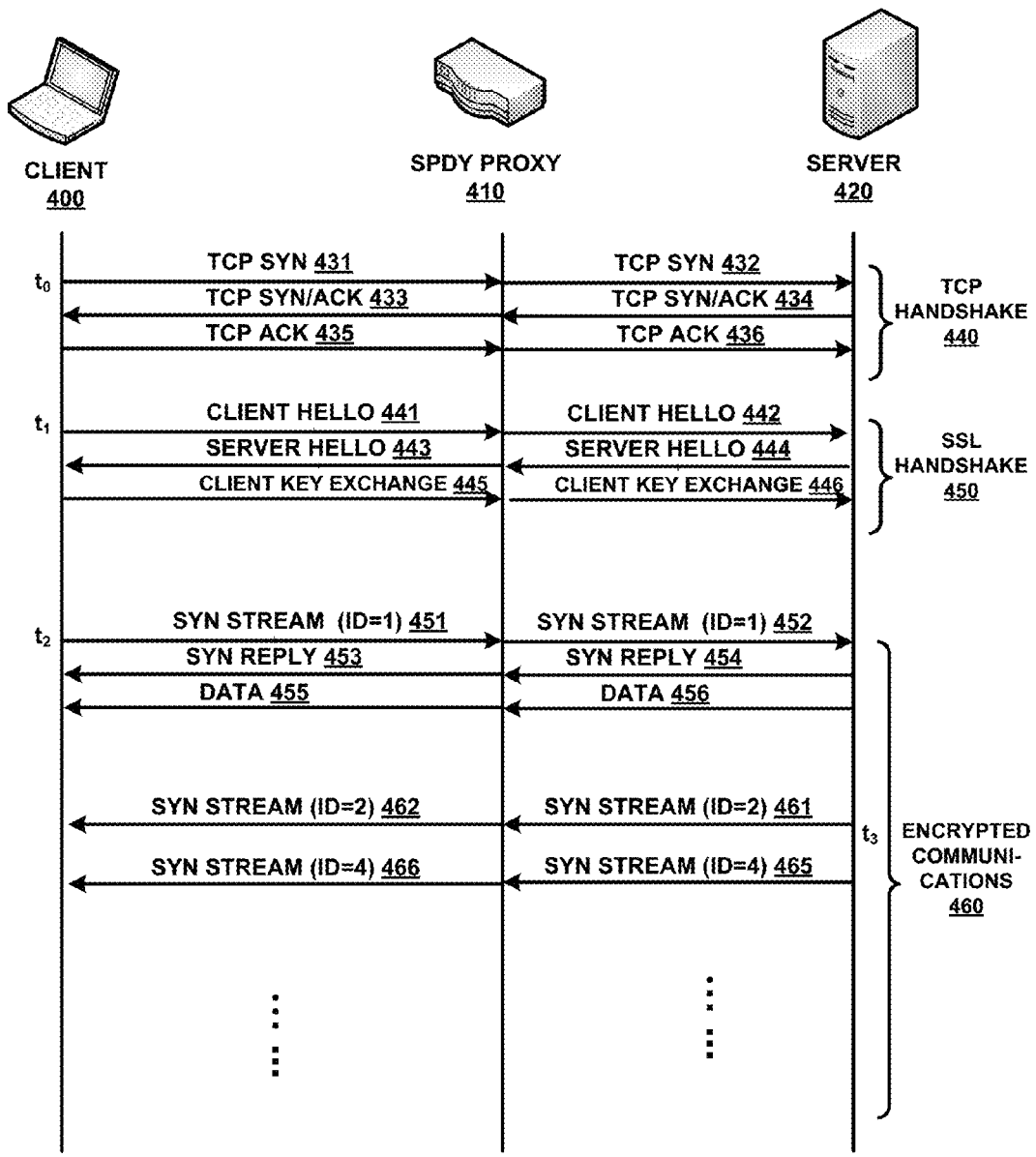
FIG. 4 shows a sequence diagram illustrating exemplary network communication exchanges involved during retrieval of a website utilizing the SPDY protocol according to embodiments of the present disclosure.

FIG. 4 shows a sequence diagram illustrating exemplary network communication exchanges involved during retrieval of a website utilizing the SPDY protocol according to embodiments of the present disclosure. SPDY generally refers to an open networking protocol for transporting web content. The SPDY protocol manipulates HTTP traffic with particular goals of reducing web page load latency and improving web security. Specifically, the SPDY protocol achieves reduced latency through compression, multiplexing, and prioritization via a proxy installed between a client device and a server. In order for retrieve web content with SPDY protocol, the SPDY protocol must be supported by both the client device and the server.

Specifically, FIG. 4 includes at least a client device 400, a SPDY proxy 410, and a server 420. In order to retrieve a website hosted by server 420 (e.g., cnn.com) using SPDY protocol, client device 400 initiates a three-way TCP handshake 440 to establish a Transmission Control Protocol (TCP) connection at time point $t_0$. The three-way handshake includes at least a TCP SYN message 431 that client device 400 sends to server 420. TCP SYN message 431 is received by SPDY proxy 410 and then forwarded to server 420 as TCP SYN message 432. In response, server 420 replies with a TCP SYN/ACK message 434. TCP SYN/ACK message 434 is also received by SPDY proxy 420 and forwarded to client device 400 as TCP SYN/ACK 433. Finally, client device 400 sends a TCP ACK message 435 back to server 420. TCP ACK message 435 is received at SPDY proxy 410 and forwarded by SPDY proxy 410 to server 420 as TCP ACK message 436. Thereafter, a first TCP connection is established between client device 400 and SPDY proxy 410; and, a second TCP connection is established correspondingly between SPDY proxy 410 and server 420.

To transmit and/or receive secure web contents, if SPDY protocol is established, the client device and the server will use the SPDY protocol, for example, when a user type in https://www.cnn.com. If either the client device or the server does not support the SPDY protocol, then the client device and the server will use the HTTPS protocol to communicate the secured web contents.

Assuming that SPDY protocol is used, at time point $t_1$, after establishment of TCP connection, client device 400 will initiate an SSL handshake 450 by sending a CLIENT HELLO message 441, which is received by SPDY proxy 410 and forwarded to server 420 as CLIENT HELLO message 442. Then, server 420 will return a SERVER HELLO message 444, which may indicate a set of Next Protocol Negotiation (NPN) extensions supported by server 420, for example, SPDY/3, SPDY/2, HTTP1.1, etc. SERVER HELLO message 444 is received by SPDY proxy 410 and forwarded to client device 400 as SERVER HELLO message 443. Next, client device 400 will select one of the server-supported NPN extension that client device 400 also supports. After client device 400 makes the selection, client device 400 transmits CLIENT KEY EXCHANGE 445 (and any other related SSL messages), which is received by SPDY proxy 410 and forwarded to server 420 as CLIENT KEY EXCHANGE 446.

Thereafter, client device 400 and server 420 start encrypted communications 460. Specifically, at time point $t_3$, client device 400 will transmit a SYN STREAM message 451, which is received by SPDY proxy 410 and forwarded to server 420 as SYN STREAM message 452. SYN STREAM message 451 (or 452) is similar to an HTTP GET message in format. It includes at least an anchor, a URL, a host, a user-agent, and an identifier that is unique for each SYN STREAM message. Subsequent SYN STREAM messages will use the same connection, but different identifiers. More particularly, if the SYN STREAM message is initiated by a client device, the identifier will be an odd number; if the SYN STREAM message is initiated by a server, the identifier will be an even number. As illustrated in FIG. 4, SYN STREAM message 451 (or SYN STREAM message 452) includes identifier ID=1.

After receiving SYN STREAM message 452, server 420 responds with a SYN REPLY message 454, which is received by SPDY proxy 410 and forwarded as SYN REPLY message 453 to client device 400. Moreover, server 420 can start sending data 456 to client device 400. Data 456 is also received by SPDY proxy 410 and forwarded to client device 400 as data 455.

In addition, once the secured connection between client device 400 and server 420 is established, server 420 can transmit more SYN STREAM messages to client device 400 without a request from client device 400. For example, at time point $t_5$, server 420 can transmit a SYN STREAM message 461 with ID=2 to client device 400. SYN STREAM message 461 is received by SPDY proxy 410 and forwarded as SYN STREAM 462 to client device 400. Moreover, server 420 can transmit another SYN STREAM message 465 with ID=4 to client device 400 either concurrently with or subsequently to the transmission of SYN STREAM message 461. Similarly, SYN STREAM message 465 is received by SPDY proxy 410 and forwarded as SYN STREAM 466 to client device 400. Client device 400 can order the received messages by the unique identifiers in the SYN STREAM messages received from server 420.

Once the communication is completed for the entire website, client device 400 or server 420 can send a FIN message to close the connection. Unlike web content retrieval with TCP protocol, the web content retrieval using SPDY proxy can be completed with a single connection for each website.

Server Certificates Issuance by SPDY Proxy

A client device will maintain a list that includes at least trusted authorities, personal certificates, and server certificates. Trusted certificates typically are used to make secure connections to a server over the Internet. A certificate is required in order to avoid malicious man-in-the-middle attack. The client device uses the Certificate Authority (CA) certificate to verify the CA signature on a received server certificate as a part of the checks before establishing a secure connection.

Client software, e.g., web browsers, may maintain a set of trusted CA certificates configured by its user. Aside from commercial CAs, some providers issue digital certificates to the public at no cost. Large institutions or government entities may have their own PKIs, each including their own CAs. Any site using self-signed certificates acts as its own CA too. Client software typically will allow their users to add or remove CA certificates at will.

A server certificate includes a number of fields, including but not limited to, a subject field indicating the subject to be trusted (e.g., website wellsfargo.com), an issuer field indicating an issuer of the certificate, a value field indicating the purpose for which the certificate is used, etc.

During the communication exchanges described in the section above, along with SERVER HELLO message, the server will also send the server certificate to the client device. Typically, when a client device receives the server certificate, the client device will compare the issuer of the server certificate with its list of trusted authorities to determine whether the server certificate is issued by a trusted authority. The server certificate is signed with a private key signature such that a third party cannot fake the server certificate. The client device can use a corresponding public key to decrypt the server certificate.

In the context of SPDY proxy, the SPDY proxy needs to be configured as a trusted authority for the client device. Thus, any server certificates signed by the SPDY proxy will be trusted by the client device. For any encrypted communications for the client device received from the server via the SPDY proxy, the SPDY proxy will decrypt a message, apply content management policies and alter the content of message as necessary, then encrypt the altered content with the SPDY proxy's own server certificate.

The SPDY proxy's own server certificate has similar fields as the server certificate originally received from the server with the SERVER HELLO message. Specifically, the SPDY proxy's server certificate includes at least a subject field and a value field having the same values as those in the original server certificate. Moreover, SPDY proxy's server certificate also includes an issuer field, which sets the SPDY proxy as the issuer of the certificate.

When a message is received from a client device, SPDY proxy will decrypt the message, then decompress the header. Also, the SPDY proxy looks up web content and filters the web content based on the URLs. The SPDY proxy will alter the content as necessary, then re-encrypt the message, and send the message to the server.

Web Content Retrieval Using Enhanced SPDY Proxy at Network Device

The firewall device could be configured in one of the following three modes: (1) the first mode disables server push, (2) the second mode disables server push based on URL reputation, and (3) the third mode enables server push.

A. Disable Server Push Mode

Figure 5:
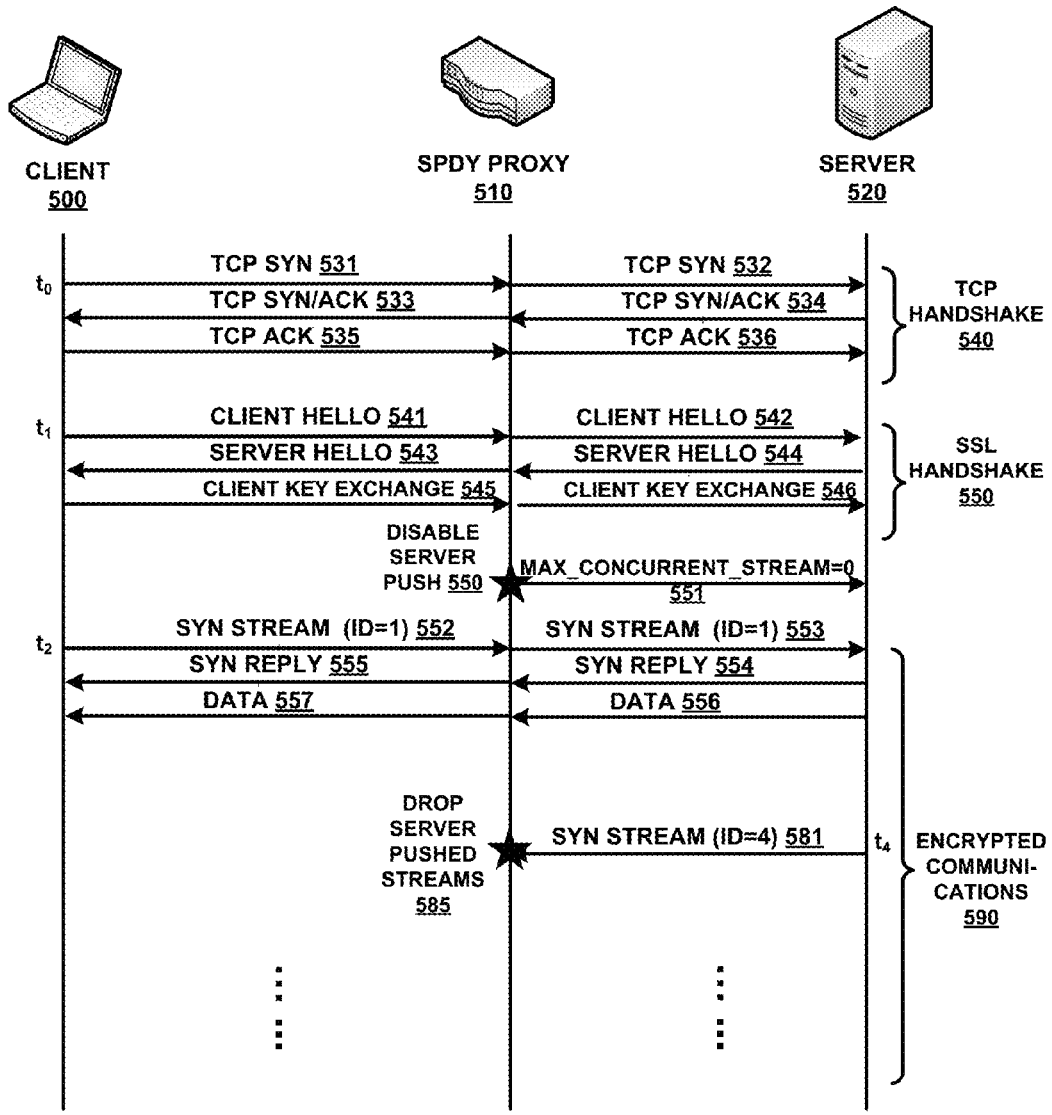
FIG. 5 shows a sequence diagram illustrating exemplary network communication exchanges involved in retrieval of a website with disable server push mode using an enhanced SPDY proxy at a network device according to embodiments of the present disclosure.

FIG. 5 shows a sequence diagram illustrating exemplary network communication exchanges involved during retrieval of a website with "disable server push mode" using an enhanced SPDY proxy at a network device according to embodiments of the present disclosure. FIG. 5 includes at least a client device 500, a network device acting as a SPDY proxy 510, and a server 520.

In the disable server push mode, server push support for the SPDY protocol is disabled by a firewall device (e.g., a SPDY proxy 510) by injecting SPDY SETTINGS control frame to the server frame with SETTINGS_MAX_CONCURRENT_STREAMS value set to 0. By setting this value to 0, the SPDY proxy 510 informs server 520 not to initiate any streams, and hence turning off the server push feature. Also, SPDY proxy 510 shall inspect the SETTINGS frame sent by client device 500 to ensure that MAX_CONCURRENT_STREAMS field, if mentioned, is set to 0. If the frame has non-zero value, the frame shall be modified by SPDY proxy 510 to reset this value to 0. In some embodiments, instead of setting the value of MAX_CONCURRENT_STREAMS to zero, SPDY Proxy 510 may reduce the threshold number of SYN STREAM messages that server 520 is allowed to send to client device 500, for example, by changing the value from 80 to 10.

As illustrated in FIG. 5, at time point $t_0$, client device 500 initiates a TCP three-way handshake 540 with server 520. TCP three-way handshake 540 includes at least a TCP SYN message 531 that client device 500 sends to server 520. TCP SYN message 531 is received by SPDY proxy 510 and then forwarded to server 520 as TCP SYN message 532. In response, server 520 replies with a TCP SYN/ACK message 534. TCP SYN/ACK message 534 is also received by SPDY proxy 520 and forwarded to client device 500 as TCP SYN/ACK 533. Finally, client device 500 sends a TCP ACK message 535 back to server 520. TCP ACK message 535 is received at SPDY proxy 510 and forwarded by SPDY proxy 510 to server 520 as TCP ACK message 536. Thereafter, a first TCP connection is established between client device 500 and SPDY proxy 510; and, a second TCP connection is established correspondingly between SPDY proxy 510 and server 520. Here, SPDY Proxy 510 intercepts the packets from client device 500 and initiates the TCP three-way handshake with server 520 acting as a proxy of server 520 to client device 500.

Next, client device 500 initiates an SSL handshake 550 with server 520. At time point $t_1$, after establishment of TCP connection, client device 500 will initiate an SSL handshake 550 with TLS Next Protocol Negotiation (NPN) extension by sending a CLIENT HELLO message 541, which is received by SPDY proxy 510 and forwarded to server 520 as CLIENT HELLO message 542. Then, server 520 will return a SERVER HELLO message 544, which may indicate a list of protocols in the extension field of Next Protocol Negotiation (NPN). SERVER HELLO message 544 is received by SPDY proxy 510 and forwarded to client device 500 as SERVER HELLO message 543. Next, client device 500 will select one of the server-supported NPN extension that client device 500 also supports. If the SPDY protocol is in the list of protocols and client device 500 accepts the SPDY protocol, client device 500 transmits CLIENT KEY EXCHANGE 545 (and any other related SSL messages), which is received by SPDY proxy 510 and forwarded to server 520 as CLIENT KEY EXCHANGE 546. If client device 500 or server 520 does not support the SPDY protocol, the connection falls back to the HTTPS mode.

After SSL handshake 550 is completed, SPDY proxy 510 immediately disables server push 550 in the disable server push mode. Specifically, SPDY proxy 510 injects SETTINGS control frame 551 to server 520 with MAX_CONCURRENT_STREAMS set to 0. This indicates to server 520 not to push any content to client devices without an associated request. Moreover, SPDY Proxy 510 shall inspect any SETTINGS control frame subsequently received from client device 500, and determines whether MAX_CONCURRENT_STREAMS is specified. If the MAX_CONCURRENT_STREAMS parameter is specified in the frame received from client device 500, SPDY proxy 510 can reset the value of MAX_CONCURRENT_STREAMS to 0 when the system is configured to operate in the disable server push mode. Alternatively, SPDY proxy 510 can drop the received SETTINGS control frame from client device 500.

Thereafter, client device 500 and server 520 start encrypted communications 590. Specifically, at time point $t_2$, client device 500 will transmit a SYN STREAM message 552, which is received by SPDY proxy 510 and forwarded to server 520 as SYN STREAM message 553. SYN STREAM message 552 (or SYN STREAM message 553) includes identifier ID=1. After receiving SYN STREAM message 553, server 520 responds with a SYN REPLY message 554, which is received by SPDY proxy 510 and forwarded as SYN REPLY message 555 to client device 500. Moreover, server 520 can start sending data 556 to client device 500. Data 556 is also received by SPDY proxy 510 and forwarded to client device 500 as data 557.

In addition, because server push is disabled 550 in this mode, server 520 shall not send any SYN STREAM to client device 500 without a request. If, for example, at time point $t_4$, a SYN STREAM message 581 with ID=4 is transmitted to client device 500 without a request, SPDY Proxy 510 will drop server pushed streams 585 and not forward the SYN STREAM message 581. By disabling server push SYN STREAM messages, SPDY Proxy 510 effectively prevents client device 500 from receiving unsolicited data by requiring client device 500 to send requests for data.

B. Disable Server Push Based on URL Reputation Mode

Figure 6:
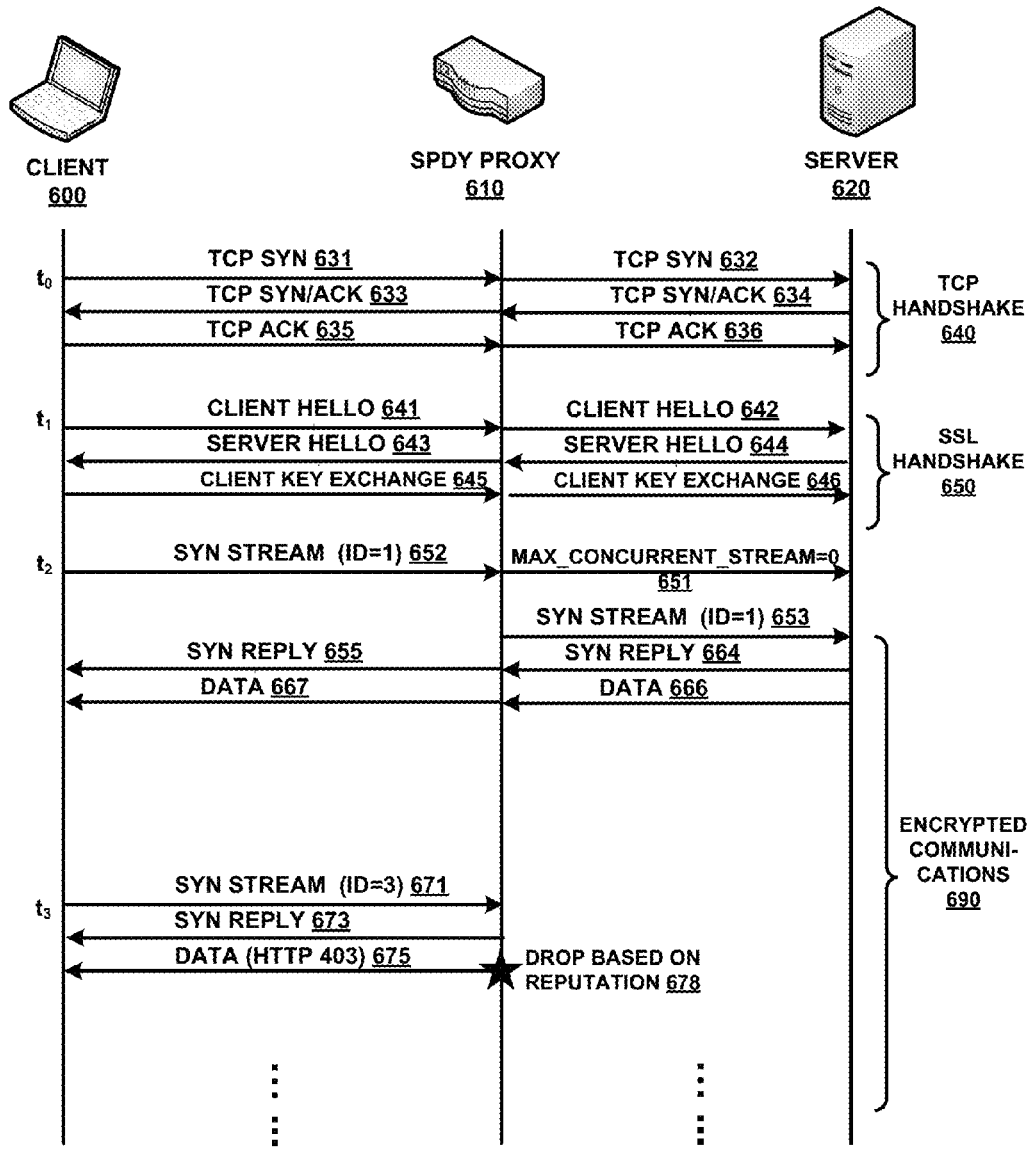
FIG. 6 shows a sequence diagram illustrating exemplary network communication exchanges involved in retrieval of a website with disable server push based on URL reputation mode using an enhanced SPDY proxy at a network device according to embodiments of the present disclosure.

FIG. 6 shows a sequence diagram illustrating exemplary network communication exchanges involved during retrieval of a website with "disable server push based on URL reputation mode" using an enhanced SPDY proxy at a network device according to embodiments of the present disclosure. FIG. 6 includes at least a client device 600, a network device acting as a SPDY proxy 610, and a server 620.

Like the "disable server push mode", in the "disable server push based on URL reputation mode", server push support for the SPDY protocol is disabled by a firewall device (e.g., a SPDY proxy 610) by injecting SPDY SETTINGS control frame to the server frame with MAX_CONCURRENT_STREAMS value set to 0. By setting this value to 0, the SPDY proxy 610 informs server 620 not to initiate any streams, and hence turning off the server push feature. Also, SPDY proxy 610 shall inspect the SETTINGS frame sent by client device 600 to ensure that SETTINGS_MAX_CONCURRENT_STREAMS field, if mentioned, is set to 0. If the frame has non-zero value, the frame shall be modified by SPDY proxy 610 to reset this value to 0 if the reputation of the URL fetched from SYN STREAM control frame falls below a predetermined threshold value.

As illustrated in FIG. 6, at time point $t_0$, client device 600 initiates a TCP three-way handshake 640 with server 620. TCP three-way handshake 640 includes at least a TCP SYN message 631 that client device 600 sends to server 620. TCP SYN message 631 is received by SPDY proxy 610 and then forwarded to server 620 as TCP SYN message 632. In response, server 620 replies with a TCP SYN/ACK message 634. TCP SYN/ACK message 634 is also received by SPDY proxy 620 and forwarded to client device 600 as TCP SYN/ACK 633. Finally, client device 600 sends a TCP ACK message 635 back to server 620. TCP ACK message 635 is received at SPDY proxy 610 and forwarded by SPDY proxy 610 to server 620 as TCP ACK message 636. Thereafter, a first TCP connection is established between client device 600 and SPDY proxy 610; and, a second TCP connection is established correspondingly between SPDY proxy 610 and server 620.

Next, at time point $t_1$, after establishment of TCP connection, client device 600 will initiate an SSL handshake 650 with TLS Next Protocol Negotiation (NPN) extension by sending a CLIENT HELLO message 641, which is received by SPDY proxy 610 and forwarded to server 620 as CLIENT HELLO message 642. Then, server 620 will return a SERVER HELLO message 644, which may indicate a list of protocols in the extension field of Next Protocol Negotiation (NPN). SERVER HELLO message 644 is received by SPDY proxy 610 and forwarded to client device 600 as SERVER HELLO message 643. Thereafter, client device 600 will select one of the server-supported NPN extensions. For example, if the SPDY protocol is in the list of protocols and client device 600 accepts the SPDY protocol, client device 600 transmits CLIENT KEY EXCHANGE 645 (and any other related SSL messages), which is received by SPDY proxy 610 and forwarded to server 620 as CLIENT KEY EXCHANGE 646. If client device 600 or server 620 does not support the SPDY protocol, the connection falls back to the HTTPS mode.

After SSL handshake 650 is completed, client device 600 starts encrypted communications 690 with server 620. Specifically, at time point $t_2$, client device 600 will transmit a SYN STREAM message 652, which is intercepted by SPDY proxy 610. SPDY proxy 610 will decompress the SYN STREAM control frame 652 to fetch the URL field. The URL is then subjected to cache lookup to get the category and reputation scores. If the reputation score of the URL is below a configured threshold value for allowing the server push feature, SPDY proxy 610 will inject SETTINGS control frame 651 to server 620 with MAX_CONCURRENT_STREAMS set to 0. SPDY proxy 610 then immediately disables server push 650 in the "disable server push based on URL reputation" mode. In particular, SPDY proxy 610 injects SETTINGS control frame 651 to server 620 with MAX_CONCURRENT_STREAMS set to 0. This indicates to server 620 not to push any content to client devices without an associated request. Moreover, SPDY Proxy 610 shall inspect any SETTINGS control frame subsequently received from client device 600, and determines whether MAX_CONCURRENT_STREAMS is specified. If the MAX_CONCURRENT_STREAMS parameter is specified in the frame received from client device 600, SPDY proxy 610 shall reset the value of MAX_CONCURRENT_STREAMS to 0. Alternatively, SPDY proxy 610 may drop the SETTINGS control frame subsequently received from client device 600 to prevent client device 600 from overwriting the MAX_CON-CURRENT_STREAMS parameter setting.

Thereafter, SPDY proxy 610 forwards to server 620 SYN STREAM message 653 that includes identifier ID=1. After receiving SYN STREAM message 653, server 620 responds with a SYN REPLY message 664, which is received by SPDY proxy 610 and forwarded as SYN REPLY message 655 to client device 600. Moreover, server 620 can start sending data 666 to client device 600. Data 666 is also received by SPDY proxy 610 and forwarded to client device 600 as data 667.

At time point $t_3$, client device 600 sends another SYN STREAM message 671 with ID=3. In the "disable server push based on URL reputation mode," SPDY proxy 610 selectively allows SYN STREAM messages based on the reputation of the website corresponding to the URL identified by each message. All SYN STREAM control frames from client device 600 will be decompressed to retrieve the value of the URL field. The URL is then used to look up in a cache to obtain at least a category value and a reputation value.

The web content categories may include, but are not limited to, auctions, shopping, business economy, streaming media, social networking, sports, search engines, malware sites, phishing, spam URLs, nudity, gambling, entertainment or arts, religion, adult pornography, etc.

Moreover, SPDY proxy 610 may retrieve a reputation score associated with the URL of the website. Based on the reputation score, SPDY proxy 610 can classify different websites into different risk levels. For example, if the URL reputation score is 1 to 20, the website is classified as "high risk;" if the URL reputation score is 21 to 40, the website is classified as "suspicious;" if the URL reputation score is 41 to 60, the website is classified as "moderate risk;" if the URL reputation score is 61 to 80, the website is classified as "low risk;" and, if the URL reputation score is 81 to 100, the website is classified as "trustworthy."

The category and reputation values are then subjected to policy enforcement. If the policy enforcement results indicate that the URL is permitted based on the category and/or reputation score associated with the website, SPDY proxy 610 will forward the SYN STREAM message to server 620. In response, server 620 will respond with SYN REPLY followed by one or more DATA frames.

On the other hand, as illustrated in FIG. 6, if the policy enforcement results indicate that the URL is denied based on the category and/or reputation score, SPDY proxy 610 will drop received frames based on reputation 678. Specifically, SPDY proxy 610 responds to client device 600 with a SYN REPLY message 673 with same identifier (i.e., ID=3), followed by a DATA frame 675 with HTTP status code 403 indicating access denial. The HTTP message with error code 403 will be displayed to the user of client device 600. In some embodiments, the error code may be accompanied by a brief statement of the reason for denial, e.g., "The network administrator has denied access to this website because it falls into the gambling category."

C. Enable Server Push Mode

Figure 7:
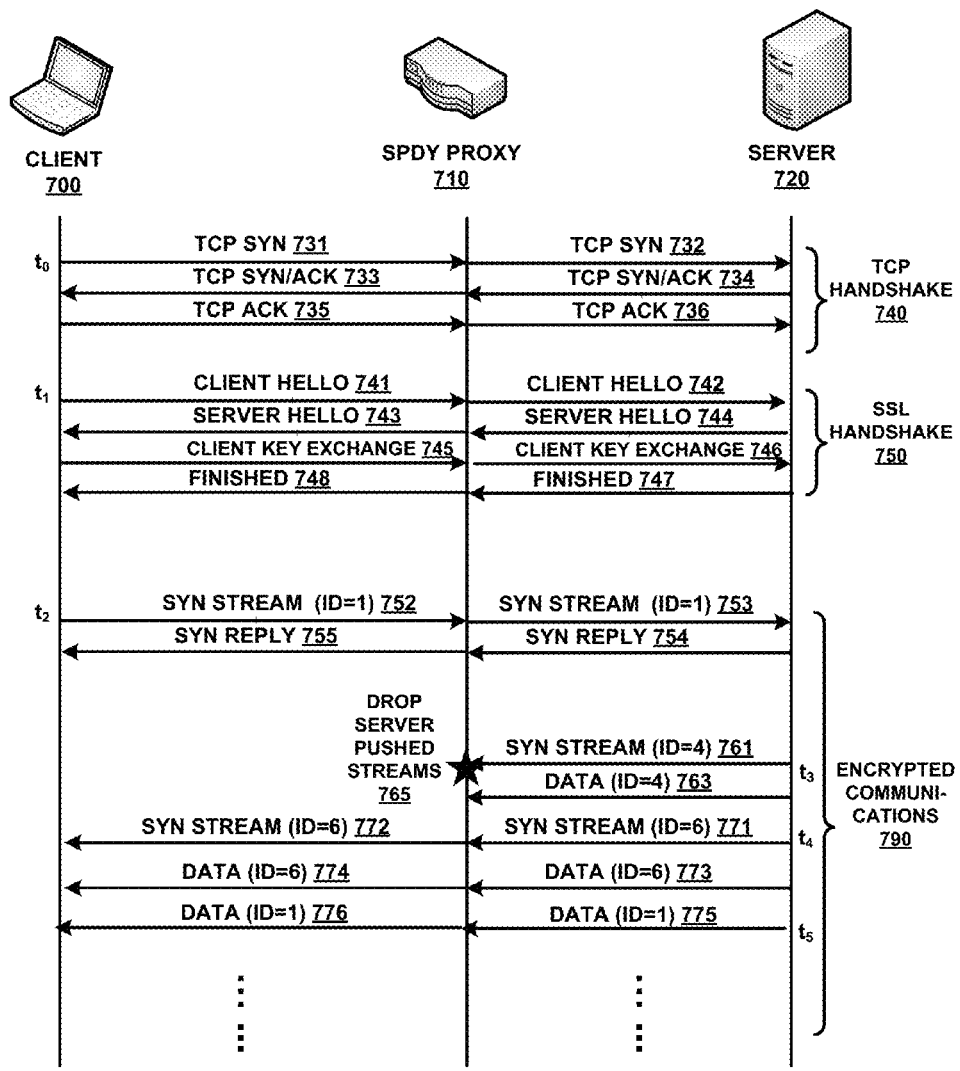
FIG. 7 shows a sequence diagram illustrating exemplary network communication exchanges involved in retrieval of a website with enable server push mode using an enhanced SPDY proxy at a network device according to embodiments of the present disclosure.

FIG. 7 shows a sequence diagram illustrating exemplary network communication exchanges involved during retrieval of a website with "enable server mode" using an enhanced SPDY proxy at a network device according to embodiments of the present disclosure. FIG. 7 includes at least a client device 700, a network device acting as a SPDY proxy 710, and a server 720. In the "enable server push mode", SPDY proxy 610 does not inject SPDY SETTINGS control frame and allows server push, but performs inspection whenever a SYN STREAM message is received either from client device 600 or server device 620.

At time point $t_0$, client device 700 initiates a TCP three-way handshake 740 with server 720. TCP three-way handshake 740 includes at least a TCP SYN message 731 that client device 700 sends to server 720. TCP SYN message 731 is received by SPDY proxy 710 and then forwarded to server 720 as TCP SYN message 732. In response, server 720 replies with a TCP SYN/ACK message 734. TCP SYN/ACK message 734 is also received by SPDY proxy 720 and forwarded to client device 700 as TCP SYN/ACK 733. Finally, client device 700 sends a TCP ACK message 735 back to server 720. TCP ACK message 735 is received at SPDY proxy 710 and forwarded by SPDY proxy 710 to server 720 as TCP ACK message 736. Thereafter, a first TCP connection is established between client device 700 and SPDY proxy 710; and, a second TCP connection is established correspondingly between SPDY proxy 710 and server 720.

Next, at time point $t_1$, after establishment of TCP connection, client device 700 will initiate an SSL handshake 750 with TLS Next Protocol Negotiation (NPN) extension by sending a CLIENT HELLO message 741, which is received by SPDY proxy 710 and forwarded to server 720 as CLIENT HELLO message 742. Then, server 720 will return a SERVER HELLO message 744, which may indicate a list of protocols in the extension field of Next Protocol Negotiation (NPN). SERVER HELLO message 744 is received by SPDY proxy 710 and forwarded to client device 600 as SERVER HELLO message 743. Thereafter, client device 700 will select one of the server-supported NPN extensions. For example, if the SPDY protocol is in the list of protocols and client device 700 accepts the SPDY protocol, client device 700 transmits CLIENT KEY EXCHANGE 745 (and any other related SSL messages), which is received by SPDY proxy 710 and forwarded to server 620 as CLIENT KEY EXCHANGE 746. Then, server 720 transmits FINISHED message 747, which is received by SPDY proxy 710 and forwarded to client device 700 as FINISHED message 748.

After SSL handshake 750 is completed, client device 700 starts encrypted communications 790 with server 720. Specifically, at time point $t_2$, client device 700 will transmit a SYN STREAM message 752, which is intercepted by SPDY proxy 710. SPDY proxy 710 then decrypts the packet, decompresses the header of the packet to retrieve the URL associated with the requested website (or application), looks up a category and/or reputation score associated with the URL, and enforce policies to determine whether to block the SYN STREAM message. If the SYN STREAM message is allowed, then SPDY proxy 710 will encrypt the SYN STREAM message and forward it to server 720 as SYN STREAM message 753 with ID=1. In response, server 720 responds with a SYN REPLY message 754, which is received by SPDY proxy 710 and forwarded as SYN REPLY message 755 to client device 700. Moreover, server 720 can start sending data frames to client device 700.

Because server push is enabled in this mode, at time point $t_3$, server 720 may sends an unsolicited SYN STREAM message 761 with ID=4. After receiving SYN STREAM message 761, SPDY proxy 710 selectively allows SYN STREAM messages based on the category and/or reputation of the website corresponding to the URL identified by each message. In some embodiments, SPDY proxy 710 can also determine whether to allow a SYN STREAM message (or how many SYN STREAM server push messages can be allowed) based on an application classification from deep packet inspection (DPI), a client reputation, a user role, a real-time load of a network controller, etc. In the example illustrated in FIG. 7, SPDY proxy 710 drops server pushed streams 765 and drops the SYN STREAM message 761 and DATA frame 763 with ID=4. By contrast, server 720 sends another unsolicited SYN STREAM message 771 with ID=6 at time point $t_4$. Assuming that SPDY proxy 710 determines to allow the SYN STREAM message after policy enforcement. Thus, SPDY proxy 710 will re-encrypt the SYN STREAM message 772 using SPDY proxy 710's own server certificate, and forward the SYN STREAM message 772 to client device 700. Likewise, when SPDY proxy 710 subsequently receives DATA frame 773 with ID=6, SPDY proxy 710 will forward the message as DATA frame 772 to client device 700.

Note that, the DATA frames may be transmitted and/or received out of order. For example, DATA frame 775 with ID=1 may be received after DATA frame 773 with ID=6. Because DATA frame 775 is in response to a request (and thus not an unsolicited message), SPDY proxy 710 will forward the message to client device 700 as DATA 776. After receiving the DATA frames, client device 700 can decrypt the messages and order the messages based on the ID sequence numbers associated with each message.

Process for Performing Content Filtering on SPDY Connections

Figure 8A:
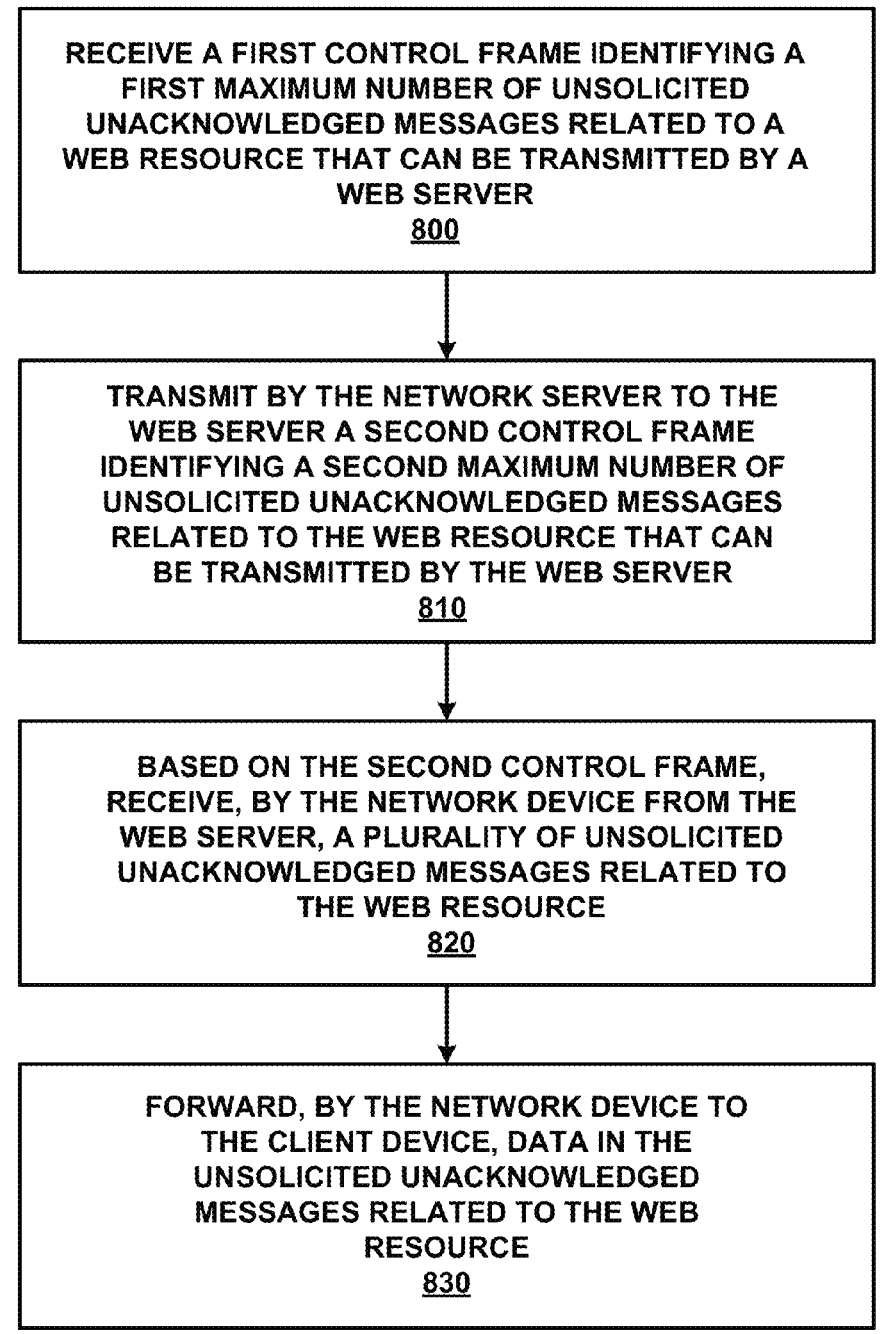
FIG. 8A and FIG. 8B illustrate exemplary processes for performing content filtering on SPDY connections according to embodiments of the present disclosure.
Figure 8B:
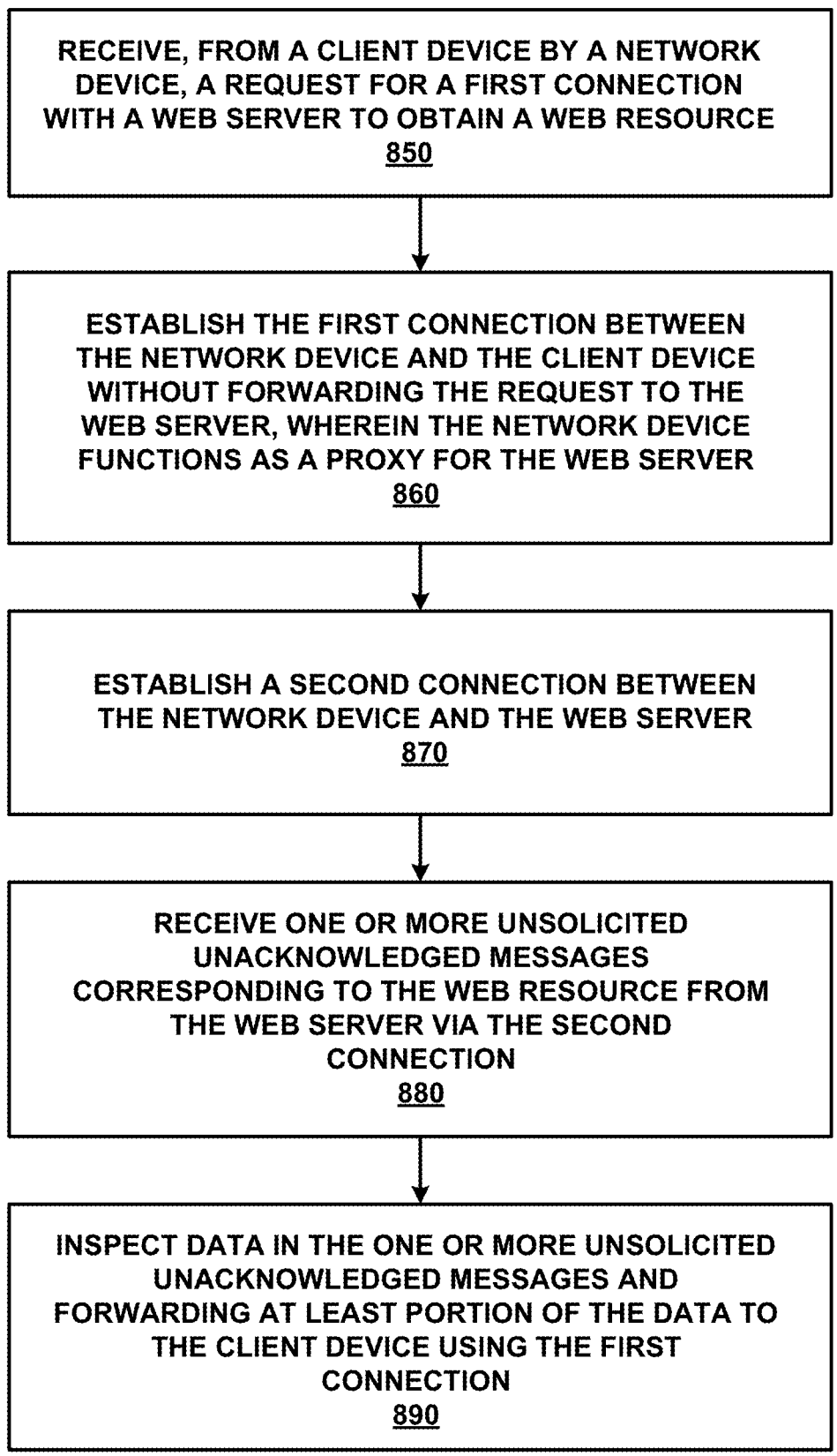

FIG. 8A and FIG. 8B illustrate exemplary processes for performing content filtering on SPDY connections according to embodiments of the present disclosure. More specifically, FIG. 8A illustrates a process for performing content filtering by reducing unsolicited unacknowledged messages. During operations, a network device receives a first control frame identifying a first maximum number of unsolicited unacknowledged messages related to a web resource that can be transmitted by a web server (operation 800). Next, the network device transmits to the web server a second control frame identifying a second maximum number of unsolicited unacknowledged messages related to the web resource that can be transmitted by the web server (operation 810). Based on the second control frame, the network device receives from the web server a plurality of unsolicited unacknowledged messages related to the web resource (operation 820). The network device then forwards to the client device data in the unsolicited unacknowledged messages related to the web resource (operation 830). Note that, the second maximum number of unsolicited unacknowledged messages is different than the first maximum number of unsolicited unacknowledged messages.

In some embodiments, based on the second control frame, the network device receives, from the web server, a plurality of unsolicited unacknowledged messages related to the web resource, and forwards to the client device data in the unsolicited unacknowledged messages related to the web resource. Specifically, forwarding the unsolicited unacknowledged messages includes at least extracting data from unsolicited unacknowledged messages received by the network device from the connection between the network device and the web server, and generating a new message to transmit from network device to the client device. The generated new message includes data in an unsolicited unacknowledged message destined to the client device, whereas the network device herein acting as a proxy server. Here, an unsolicited unacknowledged message generally refers to a server-initiated SYN STREAM message to send objects in a webpage to a client device, whereas the webpage and/or the objects therein have not been explicitly requested by the client device.

In some embodiments, the second maximum number of unsolicited unacknowledged messages related to the web resource is less than the first maximum number of unsolicited unacknowledged messages related to the web resource. Therefore, the number of allowed server pushes is limited. In some embodiments, the second maximum number of unsolicited unacknowledged messages related to the web resource that can be transmitted by a web server is zero. Therefore, the server push is completely disabled. In some embodiments, the second maximum number of unsolicited unacknowledged messages related to a web resource that can be transmitted by a web server is selected based on a reputation and/or category associated with the web resource.

In some embodiments, the second maximum number of unsolicited unacknowledged messages related to a web resource that can be transmitted by a web server is dynamically selected based on data associated with the web server that was previously cached by the network device. For example, at real time, the number of unsolicited and unacknowledged messages can be reduced as the cache for a particular web resource is built up.

In some embodiments, the second maximum number of unsolicited unacknowledged messages related to a web resource that can be transmitted by a web server is selected based on an application associated with the web resource. For example, the number of unsolicited and unacknowledged message can be determined based on a bandwidth contract for an application.

In some embodiments, the second maximum number of unsolicited unacknowledged messages related to a web resource that can be transmitted by a web server is selected based on characteristics associated with the client device. For example, the characteristics associated with the client device may be a user role. If a user role indicates that the user is an employee, fewer unsolicited unacknowledged messages will be allowed due to more strict policies applied to employees as opposed to guest users.

In some embodiments, the second maximum number of unsolicited unacknowledged messages related to a web resource that can be transmitted by a web server is selected based on prior behavior by the client device. For example, the prior behavior by the client device may be determined by a client reputation score.

Furthermore, FIG. 8B illustrates another process for performing content filtering on SPDY connections. During operations, a network device receives, from a client device, a request for a first connection with a web server to obtain a web resource (operation 850). The network device then establishes a first connection between the network device and the client device without forwarding the request to the web server (operation 860). Here, the network device functions as a proxy for the web server. Next, the network device establishes a second connection between the network device and the web server (operation 870). Also, the network device receives one or more unsolicited unacknowledged messages corresponding to the web resource from the web server via the second connection (operation 880). Furthermore, the network device inspects data in the one or more unsolicited unacknowledged messages and forwarding at least portion of the data to the client device using the first connection (operation 890).

In some embodiments, the network device receives, from the client device, a first maximum number of unsolicited unacknowledged messages related to the web resource that can be transmitted by the web server. Also, the network device transmits, to the web server, a second maximum number of unsolicited unacknowledged messages related to the web resource that can be transmitted by the web server. Note that, the first maximum number is different than the second maximum number.

In some embodiments, the network device forwards at least a portion of the data comprises filtering the data based on a reputation, category, and/or application associated with the web resource.

System for Performing Content Filtering on SPDY Connections

Figure 9:
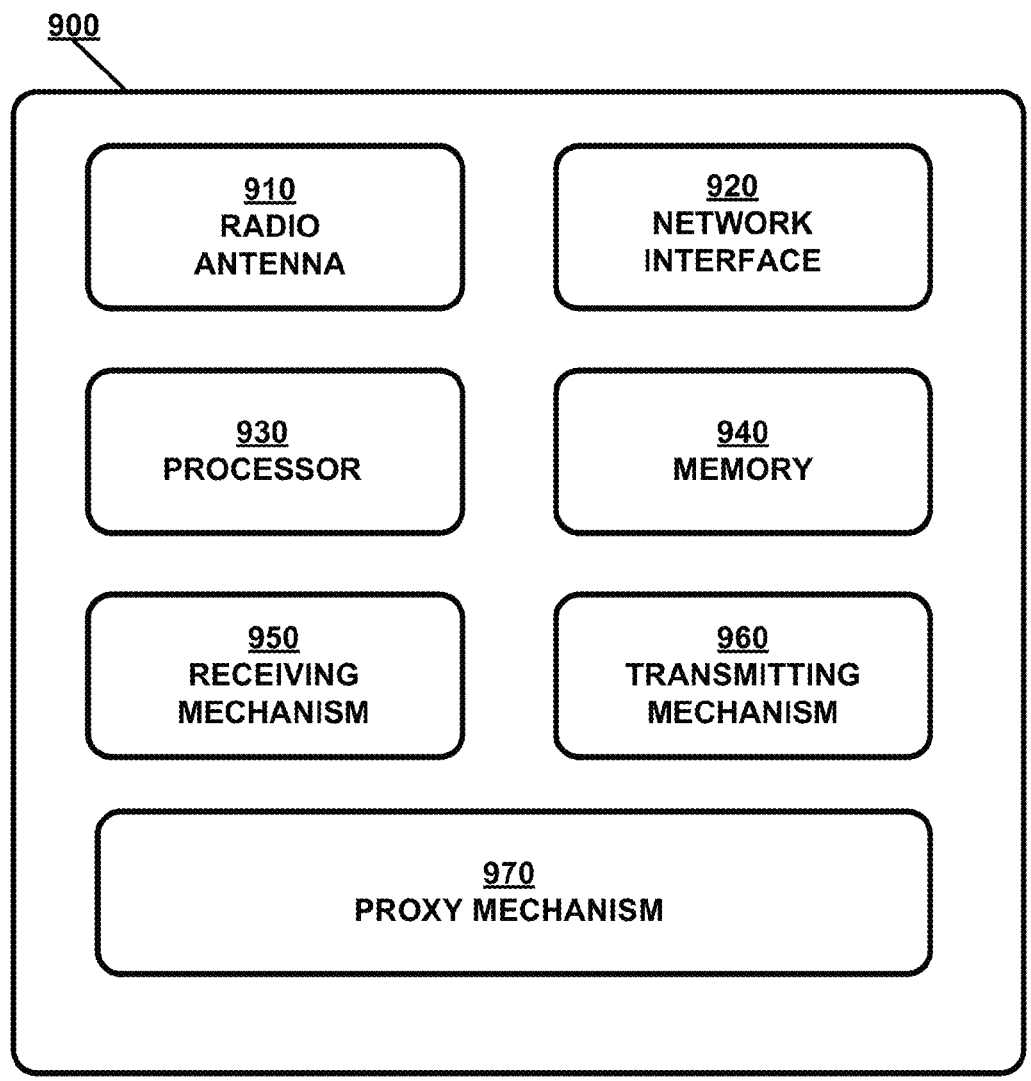
FIG. 9 is a block diagram illustrating an exemplary system for performing content filtering on SPDY connections according to embodiments of the present disclosure.

FIG. 9 is a block diagram illustrating an exemplary system for performing content filtering on SPDY connections according to embodiments of the present disclosure. Network device 900 includes at least one or more radio antennas 910 capable of either transmitting or receiving radio signals or both, a network interface 920 capable of communicating to a wired or wireless network, a processor 930 capable of processing computing instructions, and a memory 940 capable of storing instructions and data. Moreover, network device 900 further includes a receiving mechanism 950, a transmitting mechanism 960, and a proxy mechanism 970, all of which are in communication with processor 930 and/or memory 940 in network device 900. Network device 900 may be used as a client system, or a server system, or may serve both as a client and a server in a distributed or a cloud computing environment.

Radio antenna 910 may be any combination of known or conventional electrical components for receipt of signaling, including but not limited to, transistors, capacitors, resistors, multiplexers, wiring, registers, diodes or any other electrical components known or later become known.

Network interface 920 can be any communication interface, which includes but is not limited to, a modem, token ring interface, Ethernet interface, wireless IEEE 802.11 interface, cellular wireless interface, satellite transmission interface, or any other interface for coupling network devices.

Processor 930 can include one or more microprocessors and/or network processors. Memory 940 can include storage components, such as, Dynamic Random Access Memory (DRAM), Static Random Access Memory (SRAM), etc.

Receiving mechanism 950 generally receives one or more network messages via network interface 920 or radio antenna 910 from a wireless client. The received network messages may include, but are not limited to, requests and/or responses, beacon frames, management frames, control path frames, and so on. Specifically, receiving mechanism 950 can receive from a client device a control frame identifying a maximum number of unsolicited unacknowledged messages related to a web resource that can be transmitted by a web server. Based on the control frame, receiving mechanism 950 can then receive, from the web server, a plurality of unsolicited unacknowledged messages related to the web resource. Furthermore, receiving mechanism 950 can receive, from a client device, a request for a first connection with a web server to obtain a web resource.

Transmitting mechanism 960 generally transmits messages, which include, but are not limited to, requests and/or responses, beacon frames, management frames, control path frames, and so on. Specifically, transmitting mechanism 960 can transmit, to a web server, a control frame identifying a maximum number of unsolicited unacknowledged messages related to the web resource that can be transmitted by the web server.

Proxy mechanism 970 generally intercepts a network message, applies firewall policies, and forwards a portion of data to the recipient of the message. Specifically, proxy mechanism 970 can forward, to the client device, data in the unsolicited unacknowledged messages related to the web resource. Moreover, proxy mechanism 970 can establish a first connection between the network device and the client device without forwarding the request to the web server. Also, proxy mechanism 970 can establish a second connection between the network device and the web server. Upon receiving mechanism 950 receives one or more unsolicited unacknowledged messages corresponding to the web resource from the web server via the second connection, proxy mechanism 970 can inspect data in the one or more unsolicited unacknowledged messages and forward at least portion of the data to the client device using the first connection.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable comprising instructions which, when executed by one or more hardware processors, causes performance of operations comprising:
   receiving, from a client device by a network device, a first control frame identifying a first maximum number of unsolicited unacknowledged messages related to a web resource that can be transmitted by a web server;
   transmitting, by the network device to the web server, a second control frame identifying a second maximum number of unsolicited unacknowledged messages related to the web resource that can be transmitted by the web server,
   wherein the second maximum number of unsolicited unacknowledged messages is different than the first maximum number of unsolicited unacknowledged messages.

2. The medium of claim 1, wherein the operations further comprise:
   based on the second control frame: receiving, by the network device from the web server, a plurality of unsolicited unacknowledged messages related to the web resource;
   forwarding, by the network device to the client device, data in the unsolicited unacknowledged messages related to the web resource.

3. The medium of claim 1, wherein the second maximum number of unsolicited unacknowledged messages related to the web resource is less than the first maximum number of unsolicited unacknowledged messages related to the web resource.

4. The medium of claim 1, wherein the second maximum number of unsolicited unacknowledged messages related to the web resource that can be transmitted by a web server is zero.

5. The medium of claim 1, wherein the second maximum number of unsolicited unacknowledged messages related to a web resource that can be transmitted by a web server is selected based on a reputation and/or category associated with the web resource.

6. The medium of claim 1, wherein the second maximum number of unsolicited unacknowledged messages related to a web resource that can be transmitted by a web server is dynamically selected based on data associated with the web server that was previously cached by the network device.

7. The medium of claim 1, wherein the second maximum number of unsolicited unacknowledged messages related to a web resource that can be transmitted by a web server is selected based on an application associated with the web resource.

8. The medium of claim 1, wherein the second maximum number of unsolicited unacknowledged messages related to a web resource that can be transmitted by a web server is selected based on characteristics associated with the client device.

9. The medium of claim 1, wherein the second maximum number of unsolicited unacknowledged messages related to a web resource that can be transmitted by a web server is selected based on prior behavior by the client device.

10. A non-transitory computer readable comprising instructions which, when executed by one or more hardware processors, causes performance of operations comprising:
    receiving, from a client device by a network device, a request for a first connection with a web server to obtain a web resource;
    establishing, by the network device, the first connection between the network device and the client device without forwarding the request to the web server, wherein the network device functions as a proxy for the web server;
    establishing, by the network device, a second connection between the network device and the web server;
    receiving, by the network device, one or more unsolicited unacknowledged messages corresponding to the web resource from the web server via the second connection;
    inspecting, by the network device, data in the one or more unsolicited unacknowledged messages and forwarding at least portion of the data to the client device using the first connection.

11. The medium of claim 10, wherein the operations further comprise:
    receiving, by the network device from the client device, a first maximum number of unsolicited unacknowledged messages related to the web resource that can be transmitted by the web server;
    transmitting, by the network device to the web server, a second maximum number of unsolicited unacknowledged messages related to the web resource that can be transmitted by the web server,
    wherein the first maximum number is different than the second maximum number.

12. The medium of claim 10, wherein forwarding at least a portion of the data comprises filtering the data based on a reputation, category, and/or application associated with the web resource.

13. A system comprising:
   at least one device including a hardware processor;
   the system configured to perform operations comprising:
   receiving, from a client device by a network device, a first control frame identifying a first maximum number of unsolicited unacknowledged messages related to a web resource that can be transmitted by a web server;
   transmitting, by the network device to the web server, a second control frame identifying a second maximum number of unsolicited unacknowledged messages related to the web resource that can be transmitted by the web server,
   wherein the second maximum number of unsolicited unacknowledged messages is different than the first maximum number of unsolicited unacknowledged messages.

14. The system of claim 13, wherein the operations further comprise:
   based on the second control frame: receiving, by the network device from the web server, a plurality of unsolicited unacknowledged messages related to the web resource;
   forwarding, by the network device to the client device, data in the unsolicited unacknowledged messages related to the web resource.

15. The system of claim 13, wherein the second maximum number of unsolicited unacknowledged messages related to the web resource is one of: (a) less than the first maximum number of unsolicited unacknowledged messages related to the web resource; and (b) zero.

16. The system of claim 13, wherein the second maximum number of unsolicited unacknowledged messages related to a web resource that can be transmitted by a web server is selected based on a reputation and/or category associated with the web resource.

17. The system of claim 13, wherein the second maximum number of unsolicited unacknowledged messages related to a web resource that can be transmitted by a web server is dynamically selected based on data associated with the web server that was previously cached by the network device.

18. The system of claim 13, wherein the second maximum number of unsolicited unacknowledged messages related to a web resource that can be transmitted by a web server is selected based on an application associated with the web resource.

19. The system of claim 13, wherein the second maximum number of unsolicited unacknowledged messages related to a web resource that can be transmitted by a web server is selected based on characteristics associated with the client device.

20. The system of claim 13, wherein the second maximum number of unsolicited unacknowledged messages related to a web resource that can be transmitted by a web server is selected based on prior behavior by the client device.

* * * * *